SIGNAL-TRANSLATING APPARATUS

Filed Nov. 28, 1956

WALTER S. DRUZ
*INVENTOR.*
BY John J. Pederson
HIS ATTORNEY.

WALTER S. DRUZ
*INVENTOR.*

BY John J. Pederson

HIS ATTORNEY.

WALTER S. DRUZ
INVENTOR.
BY John J. Pederson
HIS ATTORNEY.

WALTER S. DRUZ
*INVENTOR.*
BY John J. Pederson
HIS ATTORNEY.

WALTER S. DRUZ
*INVENTOR.*
BY John J. Pederson
HIS ATTORNEY.

United States Patent Office 3,011,026
Patented Nov. 28, 1961

3,011,026
SIGNAL-TRANSLATING APPARATUS

Walter S. Druz, Bensenville, Ill., assignor to Zenith Radio Corporation, a corporation of Delaware Filed May 28, 1956, Ser. No. 587,600
12 Claims. (Cl. 179—1.5)

This invention pertains in general to a signal-translating apparatus, and more particularly to a novel suppressed-signal modulator that may be employed, for example, as a suppressed-carrier modulator, or, as another example, as a coding mechanism in a secrecy communication transmitter and/or as a decoding mechanism in a secrecy communication receiver. The apparatus of the invention is generic to either the transmitter portion or receiver portion of a secrecy communication system.

Previous suppressed-signal modulators have suffered from a disadvantage in that it has been extremely difficult to maintain them balanced over a wide range of frequencies in order that the undesired signal components may be suppressed throughout that range. This obtains because reactances are present which give rise to changes in operating conditions with frequency variations. The present invention provides a novel suppressed-signal modulator which is relatively easy to maintain in a balanced state since it is not dependent on any reactances.

Moreover, in prior modulators of the suppressed-signal type, which usually employ vacuum tubes having two control grids separated by a screen grid, difficulties have been experienced due to mutual reaction between the two different signal sources coupled to the respective control grids because of the interelectrode capacitance between such grids, despite the shielding effect of the screen grid, and also as a result of space charge coupling due to the effect of a virtual cathode produced between the control grids by the accelerating and subsequent decelerating action on the electron flow by the positive and negative electrostatic fields established by the screen grid and the following control grid. Such reaction between the input signal sources impairs the operating stability of the circuit and causes distortion. The present invention also overcomes this disadvantage by providing an arrangement that does not have any mutual intercoupling between input signal sources.

Accordingly, it is an object of the present invention to provide a new and improved suppressed-signal modulator which overcomes the inherent shortcomings of those of the past.

This new circuit arrangement lends itself particularly well for incorporation in a secrecy communication system as either the coding or decoding apparatus, and for that reason it is another object of the invention to provide a new and improved apparatus for a secrecy communication system.

A signal-translating apparatus, constructed in accordance with the invention, comprises a switching device including means for developing electron space current, a pair of anodes, and control-electrode means responsive to an applied signal for varying the distribution of the space current between the anodes. An output circuit is coupled between the anodes, and means is provided for intensity modulating the electron space current in accordance with an intelligence signal. The apparatus has means for applying a switching signal in predetermined phase to the control-electrode means, whereby an output signal comprising intelligence signal components and switching signal components is developed in the output circuit. Finally, the signal-translating apparatus includes means for suppressing the switching signal components in the output circuit comprising an additional switching device provided with means for developing electron space current, a pair of anodes, and control-electrode means responsive to an applied signal for varying the distribution of such electron space current between the last-mentioned anodes, the anodes of the additional switching device being connected to the anodes of the first-mentioned switching device, and means for applying the switching signal to the control-electrode means of the additional switching device.

The features of this invention which are believed to be new are set forth with particularity in the appended claims. The invention, together with further objects and advantages thereof, may best be understood, however, by reference to the following description in conjunction with the accompanying drawings, in which:

Figure 1:
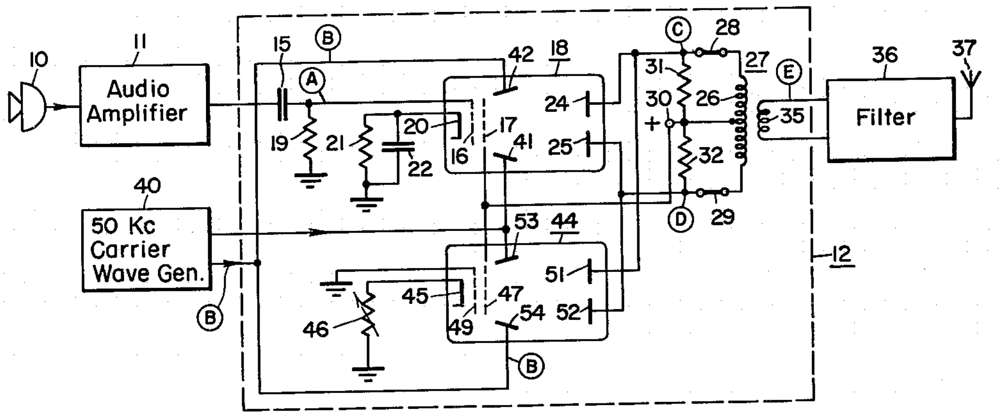
FIGURE 1 is a schematic representation of an audio transmitter including a suppressed-carrier modulator constructed in accordance with one embodiment of the invention.

The transmitter of FIGURE 1 includes a microphone 10 which is connected through an audio amplifier 11 to one input circuit of a suppressed-carrier modulator 12, which is constructed in accordance with one embodiment of the invention. Specifically, the output circuit of audio amplifier 11 is connected through a coupling condenser 15 to the intensity-control grid 16 of a beam-deflection switching device 18, a grid-leak resistor 19 being connected between the intensity-control electrode and ground. Accelerator 17 of device 18 is connected to a source 30 of positive unidirectional potential, and cathode 20 of tube 18 is connected to ground through a cathode bias resistor 21 which is shunted by a by-pass condenser 22. Two collector or beam-receiving anodes 24, 25 of beam-deflection device 18 are connected through removable links 28, 29, respectively to the two input terminals of a center-tapped primary winding 26 of a transformer 27. The center tap of primary winding 26 is connected to source 30, to beam-receiving anode 24 through a load resistor 31, and through a load resistor 32 to beam-receiving anode 25. Preferably, the resistance of resistor 31 equals that of resistor 32. The secondary winding 35 of the transformer is coupled to the input terminals of a filter 36 which, in turn, is connected to a transmitting antenna 37. A carrier wave generator 40 develops a 50-kilocycle square wave and has one output terminal connected to a beam-deflection electrode 41 of switching device 18 and another output terminal connected to another beam-deflection electrode 42 of device 18.

An auxiliary beam-deflection switching device 44 has a cathode 45 coupled to ground through a cathode biasing resistor 46. Resistor 46 is made variable in order that the cathode bias may be adjusted, for reasons which will become apparent hereinafter. Intensity-control grid 49 of tube 44 is connected to ground, and accelerator 47 is connected to source 30. Collector or beam-receiving anodes 51, 52 of the beam-deflection device are connected to anodes 24 and 25, respectively, of tube 18 while beam-deflection electrodes 53 and 54 of tube 44 are connected to deflection elements 41 and 42, respectively, of tube 18. Thus, the anodes of devices 18 and 44 are interconnected in correlative phase, while the deflection electrodes are interconnected in phase opposition.

Figure 2:
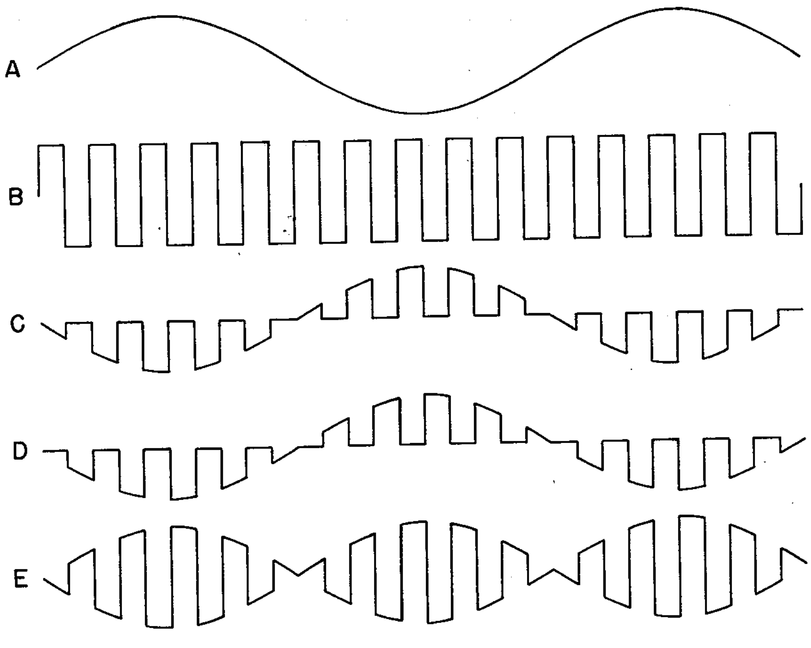
FIGURE 2 shows a family of curves useful in explaining the operation of the modulator of FIGURE 1.

In considering the operation of the transmitter of FIGURE 1, reference is made to the idealized signal wave forms shown in FIGURE 2 which appear at certain points within the suppressed-carrier modulator as indicated by encircled reference letters and are identified by corresponding letter designations in FIGURE 2. Audio or sound intelligence is picked up by microphone 10 and supplied through audio amplifier 11 to control grid 16 of switching device 18. This audio signal is shown for illustrative purposes as the sine wave of curve A of FIGURE 2 which exhibits a frequency of, for example, 5,000 cycles per second. With no potential applied to either one of beam-deflection elements 41, 42, the electron beam in tube 18 is directed along the axis so that half the electron space current is collected by anode 24 while the other half is collected by anode 25. In this way, equal currents flow in opposite directions through the two halves of primary winding 26 to source 30 so that no signal is produced in secondary winding 35. Thus, even though the beam may be intensity modulated by means of an audio signal on grid 16, that signal is not translated to secondary winding 35 in the absence of a beam-deflection voltage between deflectors 41, 42.

However, when carrier wave generator 40 is operating, a balanced 50-kilocycle square wave signal, shown in curve B, is applied between deflection electrodes 42 and 41, to direct the entire electron space current in tube 18 to anode 24 during the positive half cycles of the signal of curve B and to anode 25 during the negative half cycles. Consequently, since the electron space current of tube 18 is modulated in accordance with the audio intelligence, the audio signal is translated in alternation to the two different halves of primary winding 26 of transformer 27.

Due to the quiescent or average beam current in tube 18, which is alternately translated through the two halves of the center-tapped primary winding 26, a beam-switching component at the carrier frequency is developed across winding 26 and would ordinarily be impressed across secondary winding 35. In order to suppress or cancel out this carrier component, in accordance with one feature of the invention, beam-switching device 44 is operated so that when the quiescent or average beam current in tube 18 is flowing through, for example, the top half of winding 26, a corresponding current flows in the opposite direction through the bottom half to develop a flux field opposing that established by the current in the top half, thus effectively preventing the transfer of the carrier component to secondary winding 35. More particularly, since tube 44 is identical with tube 18 and grid 49 is grounded, tube 44 provides a constant, unvarying direct current equal to the quiescent current of beam-deflection switching device 18. Resistor 46 is adjustable so that the beam-current in tube 44 may be varied to exactly equal that of tube 18, in spite of slight differences within the range of manufacturing tolerances between the characteristics of the two tubes. The beam in tube 44 is also switched back and forth under the control of the switching signal of curve B in counterphase with the beam of tube 18, and with the correlative-phase interconnections between anodes 51 and 52 with 24 and 25, respectively, cancellation of the quiescent current flow is effectively achieved. To explain further, when the control potential impressed on deflection elements 41 and 42 is of such a polarity that the electron beam of tube 18 is directed to anode 25, thereby causing a direct quiescent current flow from that anode through the lower half of winding 26 to source 30 at the center tap, the electron beam of device 44 is directed toward beam-receiving anode 51 to develop an equal and opposite direct current flow through the top half of winding 26 to preclude the introduction of the carrier wave component into the signal developed in secondary winding 35.

Connecting links 28 and 29 have been provided for convenience in explaining the wave forms developed. Of course, due to the mutual inductance of primary winding 26, when links 28 and 29 are connected as shown the identical wave shape is found at each point along primary winding 26. Thus, in order to observe the signal that is supplied to each half winding of primary winding 26 by means of an oscilloscope or some other suitable device, links 28 and 29 are removed. The electrons collected by anodes 24 and 25 are then translated through load resistors 31 and 32, respectively, to source 30 and, of course, the wave forms across the respective load resistors are different. Specifically, with links 28 and 29 removed, the signal of curve C appears across resistor 31. From an analysis of this waveform it will be noted that since during each positive half cycle of the switching signal of curve B the intensity modulated electron beam is directed to anode 24, the instantaneous audio signal is "sampled" during those intervals. There is, of course, the normal 180° phase inversion from the audio signal of curve A to the audio component of curve C, as is the case in any class A amplifier. Similarly, from an examination of the signal of curve D which appears across resistor 32, it will be noted that during the negative half cycles of the switching signal of curve B when the beam of tube 18 is incident on anode 25, the audio signal of curve A is effectively "sampled."

By replacing connecting links 28 and 29 in the circuit as shown, the signal of curve D is effectively substracted from that of curve C across the center-tapped transformer (since it is a balanced circuit) so that the signal of curve E appears across secondary 35 and therefore at the input of filter 36. A Fourier analysis of wave form E will indicate that both the audio and carrier components are completely cancelled or suppressed. The only components present are the sum and difference frequencies or sidebands of the harmonics of the carrier frequency and the audio frequencies. Filter 36 is designed to filter out everything but a relatively small band which encompasses only one side band of the carrier fundamental or first harmonic frequency, or if it is desired to transmit both side bands of the carrier, filter 36 selects a band twice as wide. The output of the filter is then impressed on antenna 37 for radiation to the receivers.

By way of summary, the signal-translating apparatus of FIGURE 1 has a switching device 18 including means (cathode 20 and accelerator 17) for developing electron space current, a pair of anodes 24, 25, and control-electrode means 41, 42 responsive to an applied signal for varying the distribution of the space current between the anodes. An output circuit 26 is coupled between anodes 24 and 25. Microphone 10, audio amplifier 11 and control grid 16 constitute means for intensity modulating the electron space current in accordance with an intelligence signal. Means (carrier wave generator 40) is provided for applying a switching signal in predetermined phase to control-electrode means 41, 42, whereby an output signal comprising intelligence or audio signal components and switching signal components is developed in output circuit 26. The signal-translating apparatus also has means for suppressing the switching signal components in output circuit 26, and this means comprises an additional switching device 44 provided with means (cathode 45 and accelerator 47) for developing electron space current, a pair of anodes 51, 52, and control-electrode means 53, 54 responsive to an applied signal for varying the distribution of the electron space current between anodes 51 and 52, these anodes being connected to anodes 24, 25. The suppressing means also includes means (conductors from generator 40 to deflection elements 53, 54) for applying the switching signal to control-electrode means 53, 54.

Figure 3:
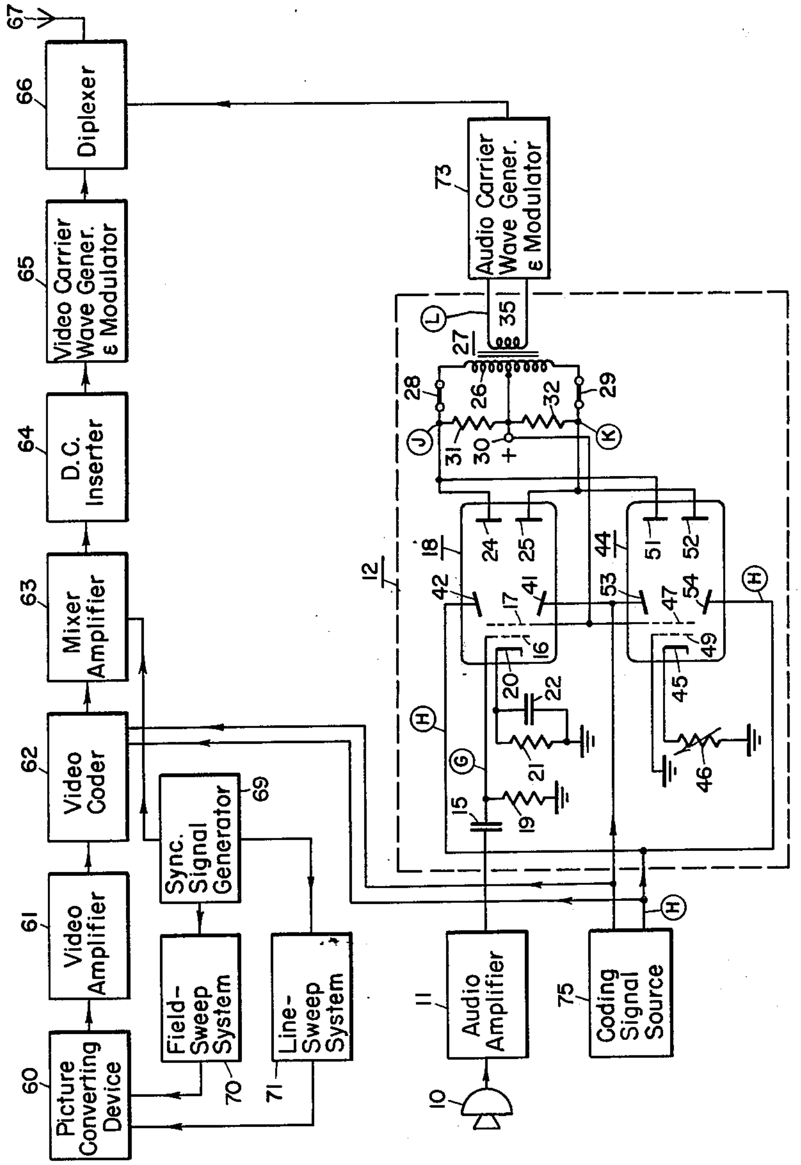
FIGURE 3 is a schematic representation of a subscription television transmitter including a coding apparatus constructed in accordance with another embodiment of the invention.

As a variant of the invention, the suppressed-signal modulator shown in FIGURE 1 is incorporated in a secrecy or subscription television transmitter in FIGURE 3 and serves as a coding apparatus for effectively coding the audio portion of a television signal. Since the suppressed-signal modulator of FIGURE 3 is identical in construction to that of FIGURE 1, identical reference numerals have been assigned to corresponding elements.

The transmitter of FIGURE 3 additionally includes a picture converting or pick-up device 60 which may be of any well known construction for deriving a video signal representing the image to be televised. The output terminals of device 60 are connected through a video amplifier 61 and a video coder 62 to one pair of input terminals of a mixer amplifier 63. Video coder 62 may be similar to that disclosed and claimed in copending application Serial No. 243,039, filed August 22, 1951, and issued August 7, 1956, as Patent 2,758,153, in the name of Robert Adler, and assigned to the present assignee. Coder 62 may comprise a beam-deflection tube, identical to either tube 18 or 44, and a pair of output circuits which may be selectively coupled into the video channel as the electron beam is deflected from one to the other of its two beam-receiving anodes which are coupled to such output circuits. One of these circuits includes a time-delay network so that the timing of the video components relative to the synchronizing components of the radiated television signal varies as the beam of the deflection tube is switched between its anodes. This switching effect is accomplished by means of a beam-deflection-control or actuating signal applied to video coder 62, as explained hereinafter. Such intermittent variation of the relative timing of the video and synchronizing components effectively codes the picture information since conventional television receivers, not equipped with suitable video decoding apparatus, require an invariant time relation of the video and synchronizing components of a received signal for intelligible image reproduction.

Mixer 63 is coupled through a direct current inserter 64 to a video carrier wave generator and modulator 65 which, in turn, is connected through a diplexer 66 to an antenna 67. The transmitter also includes a synchronizing signal generator 69 which supplies the usual field- and line-synchronizing components and associated pedestal components to mixer 63. Generator 69 further supplies field- and line-drive pulses to a field-sweep system 70 and to a line-sweep system 71, respectively. The output terminals of sweep systems 70 and 71 are connected respectively to the field- and line-deflection elements (not shown) associated with picture converting device 60.

Microphone 10, audio amplifier 11 and suppressed-signal modulator 12 are connected in series in the same manner as in FIGURE 1 but in this case instead of modulating the audio signal on a carrier for subsequent transmission, the audio signal is coded by introducing phase inversions at intervals determined by a code schedule. The output of suppressed-signal modulator 12, which now serves as a coding apparatus, is connected to a carrier wave generator and modulator 73 which, in turn, is connected to another input circuit of diplexer 66. The audio signal from amplifier 11 may be impressed on either one of the two beam-receiving anodes 24, 25 in accordance with a coding schedule as the electron beam developed within the coder is switched back and forth under the control of a deflection signal applied to deflection elements 41, 42. Suppressed-signal modulator 12 serves as a suitable phase inverting circuit to effect sound coding so that the audio signal is phase inverted each time the electron beam is switched from one anode to the other. This obtains since the instantaneous phase of the audio signal appearing across secondary 35 compared to the phase of the signal impressed on intensity-control grid 16 is 180° out of phase when the electron beam of tube 18 is incident on one of the beam-receiving anodes 24, 25 while the same signal is translated to audio carrier wave generator and modulator 73 in phase when the beam is incident on the other anode.

It will be made apparent hereinafter that the approximate frequency of the deflection-control signal may advantageously be established at 525 cycles per second to achieve very effective sound coding, since phase inverting of signals in the audio spectrum at that rate completely eliminates intelligibility. However, inasmuch as such a beam-switching frequency falls in the audio range, a signal corresponding thereto would ordinarily be impressed across secondary winding 35 due to the quiescent or average beam current which is alternately translated through the two halves of the center-tapped primary winding 26, thereby contributing unwanted distortion to the sound components.

To remedy this unfavorable condition, auxiliary switching device 44 operates to supply the required "bucking" current through the two halves of the primary winding in the same fashion as in FIGURE 1. To reiterate, when the quiescent or average beam current in tube 18 is flowing through, for example, the top half of winding 26, a corresponding current flows in the opposite direction through the bottom half to develop a flux field opposing that developed by the current in the top half, thus effectively preventing the transfer of the low frequency switching signal to audio carrier wave generator and modulator 73.

In order to achieve both sound and picture coding, a coding, control or switching signal source 75 is connected to deflection elements 41, 42 and also to the deflection electrodes of video coder 62, and in order to suppress the coding or control signal components in transformer 27 source 75 is additionally connected to deflection elements 53, 54.

The manner in which a square wave coding or control signal may be developed and information concerning its phase or other significant characteristic may be conveyed to subscriber receivers is entirely immaterial to the present invention. However, copending application Serial No. 366,727, filed July 8, 1953, and issued September 16, 1958, as Patent 2,852,598, in the name of Erwin M. Roschke, and assigned to the present assignee, shows one coding signal source suitable for use as unit 75. In the code signal generator of that application, a counting device in the form of a 30:1 multivibrator responds to line-synchronizing pulses to develop a square wave signal having amplitude changes occurring during the line-retrace interval following each succession of 15 line-trace intervals. During the vertical- or field-retrace intervals, coding pulses are developed and supplied to various input circuits of a bi-stable multivibrator to effect actuation thereof, preferably in random fashion. The counting device is rephased during each field-retrace interval under the control of the bi-stable multivibrator, and thus the square wave coding signal from the counter is phase modulated in a random manner. Since there are 15,750 horizontal scanning lines per second under present United States standards and since the square wave developed in the counting device executes an amplitude change after each interval of 15 line-trace intervals, or 30 lines for a complete cycle, the frequency of that square wave is 15,750 divided by 30 or 525 cycles per second. The code signal pulses may be transmitted along with the video signal during the field-retrace intervals to facilitate the proper phasing of a similar square wave generator at the receiver.

In the operation of the described subscription television transmitter of FIGURE 3, picture converting device 60 produces a video signal representing the program information to be televised, and this signal after amplification in video amplifier 61, is supplied through video coder 62 to mixer amplifier 63. Meanwhile, coding signal source 75 develops a square wave coding or control signal employed as a deflection-control signal for video coder 62 in order effectively to vary the time relationship between the video components and the synchronizing components of the radiated signal.

Mixer amplifier 63 also receives the customary line- and field-synchronizing and blanking pulses from generator 69 so that a coded composite television signal is developed therein. That signal is adjusted as to background level in direct current inserter 64 and is amplitude modulated on a picture carrier in unit 65. The modulated video signal is supplied through diplexer 66 to antenna 67 for transmission to subscriber receivers. It will, of course, be understood that in the generation of the video components, sweep systems 70 and 71 are synchronized by the field- and line-drive pulses applied thereto by generator 69.

At the same time, the audio information accompanying the video information is picked up by microphone 10 and supplied through amplifier 11 to control grid 16 of switching device 18 of audio coder 12. In order to simplify the explanation of the audio coding process, idealized signal wave forms which appear at certain points within the audio section indicated by encircled reference letters are identified by corresponding letter designations of the curves in FIGURE 6. Assume, for convenience of illustration, that the sinusoidal signal of curve G, which represents the uncoded audio intelligence applied to control grid 16, exhibits a frequency of approximately 2625 cycles per second. This signal intensity modulates the beam of tube 18. At the same time, coding signal source 75 provides the deflection-control square wave signal shown in curve H for application between deflection electrodes 41, 42. As mentioned before, this square wave has a frequency of approximately 525 cycles per second. The frequency of curve G (namely, 2625 cycles per second) has been made integrally related to that of curve H since it simplifies the waveform presentations; however, the operation of the coding device is not dependent on the maintenance of this or any other particular relationship between the frequencies of the intelligence and coding signals. During the positive half cycles of curve H, the beam of tube 18 is directed to anode 24 in order to translate the audio signal of curve G through the upper half of winding 26, and at the same time, the beam of auxiliary tube 44 is directed to anode 52 in order to supply a quiescent or D.C. "cancelling" current through the lower half of winding 26 to suppress the switching signal component which would otherwise be developed in secondary 35. The signal thereby developed across the upper half of winding 26 is shown in curve J (which may be observed with an oscilloscope across resistor 31 if connecting link 28 is removed), and the audio components have the customary 180° phase inversion through the tube with respect to the corresponding components of the input signal of curve G.

Figure 6:
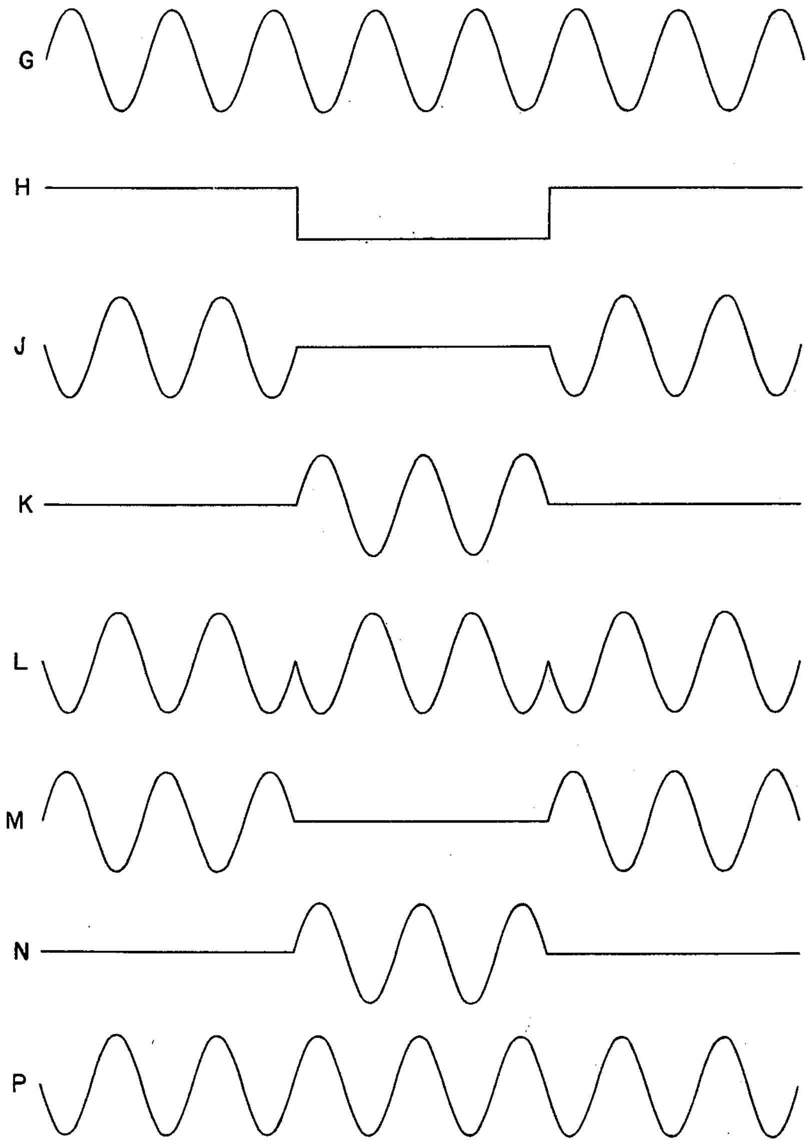
FIGURE 6 illustrates a series of wave forms which are helpful in explaining the operation of the coding apparatus shown in FIGURES 3 and 5 and the decoding apparatus disclosed in FIGURE 4.

During the negative half cycles of the switching signal of curve H, only one of which is shown in FIGURE 6, the beam of tube 18 is directed to anode 25, and that of tube 44 is switched to anode 51 to produce the switching-component-suppressing current in the upper half of winding 26. The signal of curve K is thus produced across the lower half of primary winding 26 as may be observed across resistor 32 by removing connecting link 29. With links 28 and 29 connected back into the circuit as shown in FIGURE 3, the signal of curve K is effectively subtracted from that of curve J in transformer 27 (since winding 26 is balanced) so that the coded signal of curve L appears across secondary 35. As in the case of FIGURE 1, a Fourier analysis of that coded wave form will reveal that it contains no switching component or any of the original uncoded audio information, but merely contains a series of sum and difference frequencies or audio-modulated side bands of the harmonics (including the fundamental or first harmonic) of the switching signal of curve H. The coded audio signal of curve L is then frequency modulated on a sound carrier in unit 73 and applied through diplexer 66 to antenna 67, from which it is concurrently radiated with the modulated video signal.

Figure 4:
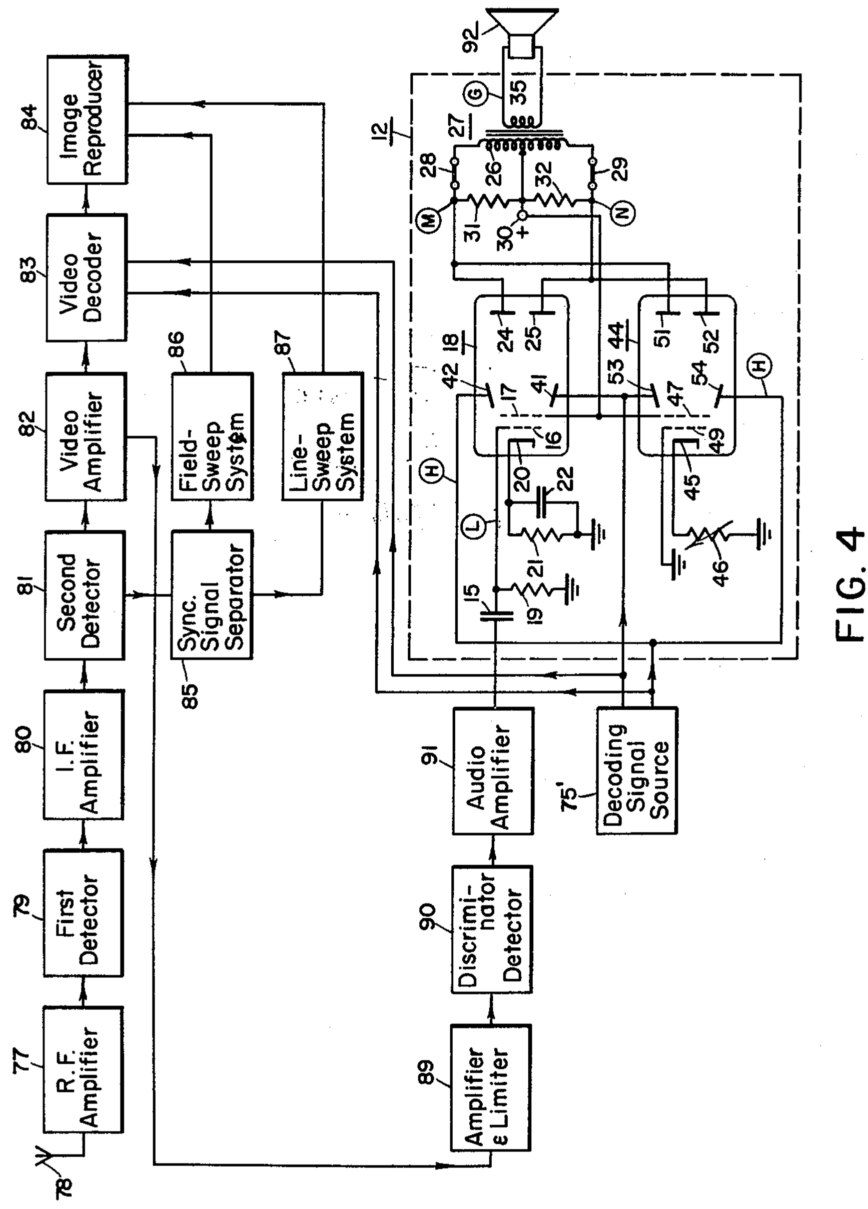
FIGURE 4 represents a subscription television receiver for operation in conjunction with the transmitter of FIGURE 3, and includes a decoding apparatus constructed in accordance with still another embodiment of the invention.

The subscription television receiver of FIGURE 4 contains another suppressed-signal modulator constructed in accordance with the invention to decode the coded audio signal radiated by the transmitter of FIGURE 3. The receiver comprises a radio-frequency amplifier 77 which has input terminals connected to an antenna 78 and output terminals connected to a first detector 79. Detector 79 is connected to an intermediate-frequency amplifier 80 which, in turn, is connected to a second detector 81 having output terminals connected to a video amplifier 82. This amplifier is connected through a video decoder 83 to the input electrodes of a cathode-ray image-reproducing device 84. Video decoder 83 may be similar to video coder 62 at the transmitter of FIGURE 3 except that it is controlled to operate in a complementary fashion in order to effectively compensate for variations in the timing of the video and synchronizing components of the received television signal.

Second detector 81 is also coupled to a synchronizing signal separator 85 which has output circuits connected to a field-sweep system 86 and to a line-sweep system 87. The output terminals of sweep systems 86 and 87 are connected respectively to field- and line-deflection elements (not shown) associated with reproducing device 84.

Video amplifier 82 is also connected to an amplifier and amplitude limiter 89 which, in turn, is coupled through a discriminator detector or demodulator 90 to an audio amplifier 91. The output of audio amplifier 91 is coupled to a suppressed-signal modulator 12 which is of identical construction as the corresponding modulator shown in FIGURES 1 and 3, as indicated by the identical reference numerals assigned to corresponding elements. In the case of FIGURE 4, however, modulator 12 serves as a decoding apparatus for effecting compensating phase inversions of the received coded audio signal in order to achieve decoding. The output of decoding apparatus 12 in FIGURE 4 is coupled to the input terminals of a speaker 92.

A decoding signal source 75', similar to unit 75 of the transmitter of FIGURE 3, is connected to the deflection-control elements 41, 42 and 53, 54 and also to video decoder 83 to provide a square wave control signal identical to that supplied to the corresponding elements at the transmitter. The square wave signal developed in unit 75' may be synchronized in phase with relation to the coding square wave of the transmitter by means of signal bursts transmitted along with the television signal during vertical-retrace intervals, as is described in the aforementioned Roschke application, Serial No. 366,727. The phase modulated square wave from source 75' effects operation of the decoding apparatus during line-retrace intervals in order to realize compensating phase inversions of the coded audio during such intervals.

In the operation of the described receiver, the coded television signal is intercepted by antenna 78, amplified in radio frequency amplifier 77 and heterodyned to the selected intermediate frequency of the receiver in first detector 79. The resulting intermediate-frequency signal is amplified in intermediate-frequency amplifier 80 and detected in second detector 81 to produce the coded composite video signal. This latter signal is amplified in video amplifier 82, translated through video decoder 83, and impressed on the input electrodes of image reproducer 84 to control the intensity of the cathode-ray beam of the reproducing device in well known manner. Video decoder 83 receives a decoding or control signal from source 75' which has amplitude variations occurring during line-retrace intervals in exact time coincidence with amplitude excursions of the coding or control signal applied as a deflection-control signal to the video coder in the transmitter of FIGURE 3, so that the video components applied to the input electrodes of image reproducer 84 are suitably compensated or decoded to effect intelligible image reproduction.

The synchronizing components of the received signal are separated in separator 85, the field-synchronizing components being utilized to synchronize sweep system 86 and, therefore, the field scanning process of the image reproducer, while the line-synchronizing pulses are utilized to synchronize sweep system 87 and, therefore, the line scansion of device 84.

An intercarrier sound signal is developed in detector 81 and separated from the video components in amplifier 82 in accordance with well understood practices in the art. The intercarrier signal is amplified and amplitude limited in unit 89, detected in demodulator or discriminator detector 90, and amplified in audio amplifier 91 to develop the signal of curve L of FIGURE 6 which, of course, is the same as the signal developed in the output of the audio coder in the transmitter.

Control grid 16 of tube 18 intensity modulates the electron beam of that tube in accordance with the wave form of curve L, and the switching signal of curve H directs the beam in alternation to anodes 24 and 25. As in the case of FIGURE 3, the switching component is effectively canceled out by the action of auxiliary switching tube 44. During the positive half cycles of curve H, the beam of tube 18 is directed to anode 24 to develop the signal of curve M across the upper half of winding 26 which may be observed across load resistor 31 when connecting link 28 is removed; similarly, during the negative half cycles of curve H, the beam of tube 18 is directed to anode 25 to produce the signal of curve N across the lower half of winding 26 as may be observed across resistor 32 with link 29 removed. The signal of curve N is subtracted from that of curve M in the transformer to develop the signal of curve G across secondary winding 35 for application to speaker 92 and, of course, this latter signal is identical to the original uncoded intelligence; decoding is thus realized.

Figure 5:
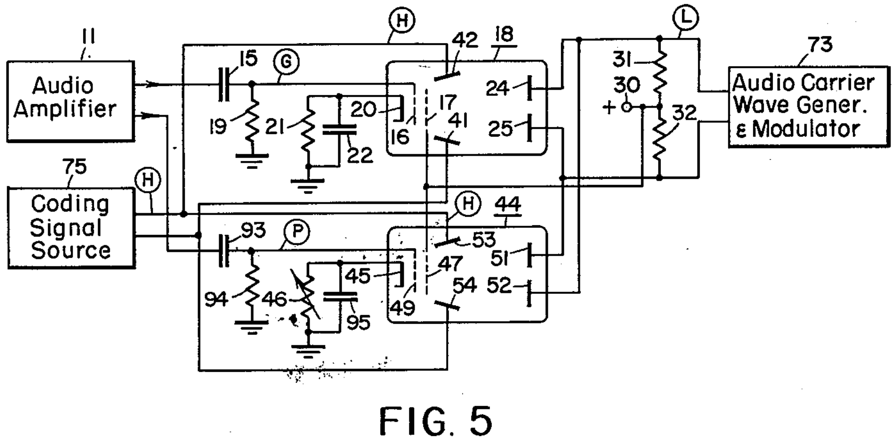
FIGURE 5 is a schematic representation of a portion of the transmitter of FIGURE 3 including a coding apparatus constructed in accordance with a further embodiment of the invention.

As explained hereinbefore, in the suppressed-signal modulator 12 in FIGURES 1, 3 and 4, the anodes of switching device 44 are connected in correlative phase to the anodes of tube 18, and the deflection electrodes of tube 44 are connected to the deflection elements of tube 18 in phase opposition. Of course, the same results may be achieved by interconnecting the anodes of tubes 18 and 44 in phase opposition and the deflectors in correlative phase. Such an arrangement is shown in the embodiment of FIGURE 5 which may be substituted for the corresponding portion of the transmitter of FIGURE 3, as indicated by the use of corresponding reference numerals. Additionally, rather than grounding control grid 49 of tube 44 directly it is instead connected to another output of audio amplifier 11 through a coupling condenser 93. Grid 49 is also returned to ground through a grid-leak resistor 94. The two outputs of audio amplifier 11 deliver the uncoded audio signal to grids 16 and 49 in opposite phase or in push-pull relationship. Inasmuch as grid 49 intensity modulates the electron beam of tube 44 in accordance with audio information, a cathode by-pass condenser 95 is provided across cathode resistor 46. Links 28 and 29 and transformer 27 have all been eliminated and the top of resistor 31 and the bottom of resistor 32 are directly connected to audio carrier wave generator and modulator 73. The output circuit comprising resistors 31 and 32 need not be balanced in this arrangement as is the case in FIGURES 1, 3 and 4 and thus the resistances do not necessarily have to be equal; the signals add up in push-pull relationship across the two resistors no matter what their relative values may be.

In the operation of the coding apparatus of FIGURE 5, the uncoded audio signal of curve G is applied to grid 16 of tube 18 as is the case in the coding apparatus in the transmitter of FIGURE 3. However, unlike the arrangement in FIGURE 3, the signal of curve P in FIGURE 6, which is identical with that of curve G only 180° out of phase, is applied to grid 49 of tube 44 so that tubes 18 and 44 are effectively operated as push-pull amplifiers. In the meantime, the coding signal of curve H is applied to the deflectors of both tubes 18 and 44 in order to translate selected portions of the signals of curves G and P through the load circuit comprising resistors 31 and 32. The translated signals effectively add across those resistors so that the coded signal of curve L is produced thereacross for application to audio carrier wave generator and modulator 73. Thus, a signal having the same wave shape, namely, that of curve L, is developed in both the arrangement of FIGURE 3 and that of FIGURE 5 except that in the latter system, the amplitude of the signal of curve L may be amplified due to the push-pull operation of the beam-deflection tubes.

Of course, the coding apparatus of FIGURE 5 may serve as a decoding apparatus in the receiver of FIGURE 4 in the same manner as the coding apparatus of FIGURE 3 is used for decoding in the receiver of FIGURE 4.

The invention provides, therefore, an improved signal-translating apparatus which exhibits advantages not achieved heretofore and, moreover, may be used in a variety of different environments.

While particular embodiments of the invention have been shown and described, modifications may be made, and it is intended in the appended claims to cover all such modifications as may be within the true spirit and scope of the invention.

I claim:

1. Signal-translating apparatus comprising: a switching device including means for developing electron-space current, a pair of anodes and control-electrode means responsive to an applied signal for varying the distribution of said space current between said anodes; an output circuit coupled between said anodes; means for intensity modulating said electron space current in accordance with an intelligence signal; means for applying a switching signal in predetermined phase to said control-electrode means, whereby an output signal comprising intelligence signal components and switching signal components is developed in said output circuit; and means for suppressing said switching signal components in said output circuit comprising an additional switching device provided with means for developing electron space current, a pair of anodes and control-electrode means responsive to an applied signal for varying the distribution of such electron space current between said last-mentioned anodes, the anodes of said additional switching device being connected to the anodes of said first-mentioned switching device, and means for applying said switching signal to said control-electrode means of said additional switching device.

2. Signal-translating apparatus comprising: a switching device including means for developing electron space current, a pair of anodes and control-electrode means responsive to an applied signal for varying the distribution of said space current between said anodes; a balanced output circuit coupled between said anodes; means for intensity modulating said electron space current in accordance with an intelligence signal; means for applying a switching signal in predetermined phase to said control-electrode means, whereby an output signal comprising intelligence signal components and switching signal components is developed in said output circuit; and means for suppressing said switching signal components in said output circuit comprising an additional switching device provided with means for developing electron space current, a pair of anodes and control-electrode means responsive to an applied signal for varying the distribution of such electron space current between said last-mentioned anodes, the anodes of said additional switching device being connected in correlative phase to the anodes of said first-mentioned switching device, and means for applying said switching signal to said control-electrode means of said additional switching device in synchronous phase opposition with respect to its application to the control-electrode means of said first-mentioned switching device.

3. Signal-translating apparatus comprising: a switching device including means for developing electron-space current, a pair of anodes and control-electrode means responsive to an applied signal for varying the distribution of said space current between said anodes; an output circuit coupled between said anodes; means for intensity modulating said electron space current in accordance with an intelligence signal; means for applying a switching signal in predetermined phase to said control-electrode means, whereby an output signal comprising intelligence signal components and switching signal components is developed in said output circuit; and means for suppressing said switching signal components in said output circuit comprising an additional switching device provided with means for developing electron space current, a pair of anodes and control-electrode means responsive to an applied signal for varying the distribution of such electron space current between said last-mentioned anodes, the anodes of said additional switching device being connected in phase opposition to the anodes of said first-mentioned switching device, and means for applying said switching signal to said control-electrode means of said additional switching device in correlative phase with respect to its application to the control-electrode means of said first-mentioned switching device.

4. An apparatus for a secrecy communication system comprising: a switching device including means for developing electron space current, a pair of anodes and control-electrode means responsive to an applied signal for varying the distribution of said space current between said anodes; an output circuit coupled betwen said anodes; means for intensity modulating said electron space current in accordance with an intelligence signal; means for developing a control signal having characteristics variations representing a predetermined code schedule; means for applying said control signal in predetermined phase to said control-electrode means to direct said electron space current to one of said anodes for certain time intervals and to direct said space current to the other of said anodes for intervening time intervals, whereby an output signal comprising intelligence signal components and control signal components and altered in accordance with said predetermined code schedule is developed in said output circuit; and means for suppressing said control signal components in said output circuit comprising an additional switching device provided with means for developing electron space current, a pair of anodes and control-electrode means responsive to an applied signal for varying the distribution of such electron space current between said last-mentioned anodes, the anodes of said additional switching device being connected to the anodes of said first mentioned switching device, and means for applying said control signal to said control-electrode means of said additional switching device.

5. An apparatus for a secrecy communication system comprising: a switching device including means for developing electron space current, a pair of anodes and control-electrode means responsive to an applied signal for varying the distribution of said space current between said anodes; a balanced output circuit coupled between said anodes; means for intensity modulating said electron space current in accordance with an audio signal; means for developing a control signal exhibiting a rectangular wave shape with its amplitude variations representing a predetermined code schedule; means for applying said control signal in predetermined phase to said control-electrode means to direct said electron space current to one of said anodes for certain time intervals and to direct said electron space current to the other of said anodes for intervening time intervals, whereby an output signal comprising audio signal components and control signal components and having phase inversions determined by said predetermined code schedule is developed in said output circuit; and means for suppressing said control signal components in said output circuit comprising an additional switching device provided with means for developing electron space current, a pair of anodes and control-electrode means responsive to an applied signal for varying the distribution of said electron space current between said last-mentioned anodes, the anodes of said additional switching device being connected to the anodes of said first-mentioned switching device, and means for applying said control signal to said control-electrode means of said additional switching device.

6. An apparatus for a secrecy communication system comprising: a beam-deflection switching device including means for developing a beam of electron space current, a pair of beam-receiving anodes, a control grid, and a pair of beam-deflection electrodes for varying the distribution of said space current between said anodes; a balanced output circuit including a center-tapped transformer coupled between said beam-receiving anodes; means for developing an audio signal; means for impressing said audio signal on said control grid to intensity modulate said electron space current in accordance therewith; means for developing a control signal exhibiting a rectangular wave shape with its amplitude variations representing a predetermined code schedule; means for applying said control signal in predetermined phase to said beam-deflection electrodes to direct said beam of electron space current to one of said beam-receiving anodes for certain time intervals and to direct said beam to the other of said anodes for intervening time intervals, whereby an output signal comprising audio signal components and control signal components and having phase inversions determined by said predetermined code schedule is developed in said output circuit; and means for suppressing said control signal components in said output circuit comprising an additional beam-deflection switching device provided with means for developing a beam of electron space current, a pair of beam-receiving anodes, and a pair of beam-deflection electrodes for varying the distribution of such electron space current between said last-mentioned anodes, the anodes of said additional switching device being connected to the beam-receiving anodes of said first-mentioned beam-deflection switching device, and means for applying said control signal to said beam-deflection electrodes of said additional switching device.

7. An apparatus for a secrecy communication system comprising: a beam-deflection switching device including means for developing a beam of electron space current, a pair of beam-receiving anodes, a control grid, and a pair of beam-deflection electrodes for varying the distribution of said space current between said anodes; a balanced output circuit including a center-tapped transformer coupled between said beam-receiving anodes; means for developing an audio signal; means for impressing said audio signal on said control grid to intensity modulate said electron space current in accordance therewith; means for developing a control signal exhibiting a rectangular wave shape with its amplitude variations representing a predetermined code schedule; means for applying said control signal in predetermined phase to said beam-deflection electrodes to direct said beam of electron space current to one of said beam-receiving anodes for certain time intervals and to direct said beam to the other of said anodes for intervening time intervals, whereby an output signal comprising audio signal components and control signal components and having phase inversions determined by said predetermined code schedule is developed in said output circuit; and means for suppressing said control signal components in said output circuit comprising an additional beam-deflection switching device provided with means for developing a beam of electron space current, a pair of beam-receiving anodes, and a pair of beam-deflection electrodes for varying the distribution of such electron space current between said last-mentioned anodes, the anodes of said additional switching device being connected in correlative phase to the beam-receiving anodes of said first-mentioned beam-deflection switching device, means for applying said control signal to said beam-deflection electrodes of said additional switching device in synchronous phase opposition with respect to its application to the beam-deflection electrodes of said first-mentioned switching device, and means for adjusting the amplitude of the electron space current in said additional beam-deflection switching device to achieve complete suppression of said control signal components in said output circuit.

8. A coding arrangement for a secrecy communication transmitter comprising: a switching device including means for developing electron space current, a pair of anodes and control-electrode means responsive to an applied signal for varying the distribution of said space current between said anodes; an output circuit coupled between said anodes; means for intensity modulating said electron space current in accordance with an uncoded intelligence signal; means for developing a coding signal having characteristic variations representing a predetermined code schedule; means for applying said coding signal in predetermined phase to said control-electrode means to direct said electron space current to one of said anodes for certain time intervals and to direct said space current to the other of said anodes for intervening time intervals, whereby an output signal comprising intelligence signal components and coding signal components and coded in accordance with said predetermined code schedule is developed in said output circuit; and means for suppressing said coding signal components in said output circuit comprising an additional switching device provided with means for developing electron space current, a pair of anodes and control-electrode means responsive to an applied signal for varying the distribution of such electron space current between said last-mentioned anodes, the anodes of said additional switching device being connected to the anodes of said first-mentioned switching device, and means for applying said coding signal to said control electrode means of said additional switching device.

9. A decoding apparatus for a secrecy communication receiver comprising: a switching device including means for developing electron space current, a pair of anodes and control-electrode means responsive to an applied signal for varying the distribution of said space current between said anodes; an output circuit coupled between said anodes; means for intensity modulating said electron space current in accordance with a coded intelligence signal; means for developing a decoding signal having characteristic variations representing a predetermined code schedule; means for applying said decoding signal in predetermined phase to said control-electrode means to direct said electron space current to one of said anodes for certain time intervals and to direct said space current to the other of said anodes for intervening time intervals, whereby an output signal comprising intelligence signal components and decoding signal components and decoded in accordance with said predetermined code schedule is developed in said output circuit; and means for suppressing said decoding signal components in said output circuit comprising an additional switching device provided with means for developing electron space current, a pair of anodes and control-electrode means responsive to an applied signal for varying the distribution of such electron space current between said last-mentioned anodes, the anodes of said additional switching device being connected to the anodes of said first-mentioned switching device, and means for applying said decoding signal to said control-electrode means of said additional switching device.

10. A secrecy communication receiver comprising: means for developing a decoding signal exhibiting a rectangular wave shape with its amplitude variations representing a predetermined code schedule; means for developing a coded audio signal having a number of phase inversions occurring with a time distribution determined in accordance with said code schedule; and a phase-inverting decoding device including a suppressed-signal modulator coupled to both said means and responsive to said decoding signal for inverting the phase of said coded audio signal at intervals determined by said code schedule effectively to decode said coded audio signal.

11. Signal-translating apparatus comprising: a switching device including means for developing electron-space current, a pair of anodes and control-electrode means responsive to an applied signal for varying the distribution of said space current between said anodes; an output circuit coupled between said anodes; means for intensity modulating said electron space current in accordance with an intelligence signal; means for applying a switching signal in predetermined phase to said control-electrode means, whereby an output signal comprising intelligence signal components and switching signal components is developed in said output circuit; and means for suppressing said switching signal components in said output circuit comprising an additional switching device provided with means for developing electron space current, a pair of anodes and control-electrode means responsive to an applied signal for varying the distribution of such electron space current between said last-mentioned anodes, the anodes of said additional switching device being connected to the anodes of said first-mentioned switching device, means for applying said switching signal to said control-electrode means of said additional switching device, and means for intensity modulating the electron space current of said additional switching device in accordance with said intelligence signal but in phase opposition with respect to the intensity modulation of the electron space current in said first-mentioned switching device.

12. An apparatus for a secrecy communication system comprising: a beam-deflection switching device including means for developing a beam of electron space current, a pair of beam-receiving anodes, a control grid, and a pair of beam-deflection electrodes for varying the distribution of said space current between said anodes; an output circuit coupled between said anodes; means for developing an audio signal; means for impressing said audio signal on said control grid to intensity modulate said electron space current in accordance therewith; means for developing a control signal exhibiting a rectangular wave shape with its amplitude variations representing a predetermined code schedule; means for applying said control signal in predetermined phase to said beam-deflection electrodes to direct said beam of electron space current to one of said beam-receiving anodes for certain time intervals and to direct the beam to the other of said anodes for intervening time intervals, whereby an output signal comprising audio signal components and encoding signal components and having phase inversions determined by said predetermined code schedule is developed in said output circuit; and means for suppressing said control signal components in said output circuit comprising an additional beam-deflection switching device provided with means for developing a beam of electron space current, a pair of beam-receiving anodes, a control grid, and a pair of beam-deflection electrodes for varying the distribution of such electron space current between said last-mentioned anodes, the anodes of said additional switching device being connected to the beam-receiving anodes of said first-mentioned beam-deflection switching device, means for applying said control signal to said beam-deflection electrodes of said additional switching device, and means for applying said audio signal to the control grid of said additional switching device in phase opposition with respect to its application to the control grid of said first-mentioned switching device.

References Cited in the file of this patent

UNITED STATES PATENTS

| | | |
|---|---|---|
| 1,588,415 | Hartley | June 15, 1926 |
| 1,988,621 | Hansell | Jan. 22, 1935 |
| 2,179,106 | Taylor et al. | Nov. 7, 1939 |
| 2,269,688 | Roth | Jan. 13, 1942 |
| 2,484,107 | Maron | Oct. 11, 1949 |
| 2,538,543 | Usselman | Jan. 16, 1951 |
| 2,547,598 | Roschke | May 28, 1956 |
| 2,758,153 | Adler | Nov. 1, 1960 |